(12) United States Patent
Karmi et al.

(10) Patent No.: US 10,042,546 B2
(45) Date of Patent: Aug. 7, 2018

(54) SYSTEMS AND METHODS TO PRESENT MULTIPLE FRAMES ON A TOUCH SCREEN

(75) Inventors: Yair Karmi, San Diego, CA (US); Philip D Floyd, San Jose, CA (US); Eric J Worthington, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 12/986,850

(22) Filed: Jan. 7, 2011

(65) Prior Publication Data
US 2012/0176322 A1 Jul. 12, 2012

(51) Int. Cl.
*G06F 3/041* (2006.01)
*G06F 3/0488* (2013.01)

(52) U.S. Cl.
CPC ........... *G06F 3/04883* (2013.01); *G06F 2203/04803* (2013.01); *G06F 2203/04808* (2013.01)

(58) Field of Classification Search
CPC ......... G06F 3/04883; G06F 3/04886; G06F 3/0488; G06F 3/0481; G06F 2203/04803; G06F 2203/04808; G06F 3/017; G06F 3/041; G06F 3/044; G06F 3/048
USPC .......................... 715/781, 788, 863; 455/564
See application file for complete search history.

(56) References Cited

U.S. PATENT DOCUMENTS

| | | | |
|---|---|---|---|
| 4,821,029 A | 4/1989 | Logan et al. | |
| 6,335,725 B1 | 1/2002 | Koh et al. | |
| 8,436,821 B1 * | 5/2013 | Plichta | G06F 3/04883 345/156 |
| 8,493,344 B2 * | 7/2013 | Fleizach et al. | 345/173 |
| 2003/0076351 A1 * | 4/2003 | Ide et al. | 345/738 |
| 2006/0197753 A1 | 9/2006 | Hotelling | |
| 2007/0097084 A1 * | 5/2007 | Niijima | B60K 35/00 345/173 |
| 2007/0097092 A1 | 5/2007 | Jung et al. | |
| 2007/0000769 A1 | 9/2007 | Otsuka et al. | |
| 2008/0001928 A1 * | 1/2008 | Yoshida | G06F 3/04883 345/173 |
| 2008/0168403 A1 * | 7/2008 | Westerman | G06F 3/04883 715/863 |

(Continued)

FOREIGN PATENT DOCUMENTS

| | | |
|---|---|---|
| CN | 101685373 A | 3/2010 |
| EP | 2169523 A1 | 3/2010 |

(Continued)

OTHER PUBLICATIONS iTunes Preview—Desktop for iPhone, iPod Touch, and iPad on the iTunes App Store—http://itunes.apple.com/us/app/desktop/id364733732?mt=8, printed May 26, 2010, 3 pp.

(Continued)

*Primary Examiner* — Sang H Kim
(74) *Attorney, Agent, or Firm* — Kilpatrick Townsend & Stockton

(57) ABSTRACT

A method of presenting multiple frames on a touch screen is disclosed. In a particular embodiment, the method includes detecting multiple touch locations on a touch screen of an electronic device for at least an activation time. The method also includes splitting a display area of the touch screen into a first frame and a second frame based on the multiple touch locations.

14 Claims, 7 Drawing Sheets

(56) References Cited

U.S. PATENT DOCUMENTS

| | | | |
|---|---|---|---|
| 2009/0021475 A1* | 1/2009 | Steinle et al. | 345/156 |
| 2009/0091547 A1* | 4/2009 | Kikuoka | G06F 3/04886 |
| | | | 345/173 |
| 2009/0267903 A1* | 10/2009 | Cady | G06F 3/0416 |
| | | | 345/173 |
| 2009/0303231 A1* | 12/2009 | Robinet et al. | 345/419 |
| 2010/0026649 A1 | 2/2010 | Shimizu et al. | |
| 2010/0079392 A1* | 4/2010 | Chiang | G06F 3/041 |
| | | | 345/173 |
| 2010/0081475 A1* | 4/2010 | Chiang | G06F 3/0483 |
| | | | 455/564 |
| 2010/0097338 A1* | 4/2010 | Miyashita | G06F 3/04883 |
| | | | 345/173 |
| 2010/0149109 A1 | 6/2010 | Elias | |
| 2010/0259493 A1* | 10/2010 | Chang | G06F 3/04883 |
| | | | 345/173 |
| 2011/0096087 A1* | 4/2011 | Chun | G06F 3/04886 |
| | | | 345/592 |
| 2011/0099473 A1* | 4/2011 | Son | G06F 3/04883 |
| | | | 715/704 |
| 2011/0141012 A1* | 6/2011 | Noh | G06F 3/0488 |
| | | | 345/157 |
| 2011/0161860 A1* | 6/2011 | Choi et al. | 715/781 |
| 2011/0205248 A1 | 8/2011 | Honda et al. | |
| 2011/0221701 A1* | 9/2011 | Zhang | G06F 3/0418 |
| | | | 345/174 |
| 2011/0238690 A1* | 9/2011 | Arrasvuori | G06F 3/04812 |
| | | | 707/769 |
| 2012/0019464 A1* | 1/2012 | Didato | A41D 13/087 |
| | | | 345/173 |
| 2012/0192093 A1* | 7/2012 | Migos et al. | 715/773 |
| 2013/0241847 A1* | 9/2013 | Shaffer | G06F 3/038 |
| | | | 345/173 |

FOREIGN PATENT DOCUMENTS

| | | |
|---|---|---|
| EP | 2177983 A2 | 4/2010 |
| JP | H0696080 A | 4/1994 |
| JP | 2001290585 A | 10/2001 |
| JP | 2007188233 A | 7/2007 |
| JP | 2007241410 A | 9/2007 |
| JP | 2007257220 A | 10/2007 |
| JP | 2008165735 A | 7/2008 |
| JP | 2009509236 A | 3/2009 |
| JP | 2010039558 A | 2/2010 |
| JP | 2010097473 A | 4/2010 |
| JP | 2010102662 A | 5/2010 |
| WO | 2006094308 | 9/2006 |
| WO | 2007037809 A1 | 4/2007 |
| WO | 2010008078 A1 | 1/2010 |
| WO | 2010041826 A2 | 4/2010 |

OTHER PUBLICATIONS

International Search Report and Written Opinion—PCT/US2012/020570—ISA/EPO—dated Apr. 25, 2012.

* cited by examiner

SYSTEMS AND METHODS TO PRESENT MULTIPLE FRAMES ON A TOUCH SCREEN

I. FIELD

The present disclosure is generally related to splitting a display of a touch screen into multiple frames.

II. DESCRIPTION OF RELATED ART

Some electronic devices include "touch screens" or touch screen displays, which provide display functionality in combination with touch input. The electronic devices may be mobile communication devices, personal digital assistants, and tablet computers that allow users to utilize various applications and features. A touch screen may detect the presence and location of a touch on the touch screen by a user. Some touch screens may detect the touch of an inanimate object, such as a stylus.

Some electronic devices that include touch screens allow users to generate multiple frames on the touch screen. The multiple frames may be produced by splitting the touch screen into a first frame and a second frame in response to a user that touches the touch screen at a first contact point and moves the contact point across the touch screen.

III. SUMMARY

A user may create two frames in a touch screen by simultaneously contacting multiple locations of the touch screen for at least an activation time. User selected settings determine where the split is positioned if multiple touch locations on the touch screen are detected. After creation of the two frames, additional frames may be created in the touch screen. Created frames may be removed by double tapping on a split (e.g., a boundary line) between frames or by dragging the split off of the touch screen.

In a particular embodiment, a method includes detecting simultaneous multiple touch locations on a touch screen of an electronic device for at least an activation time. The method also includes splitting a display area of the touch screen into a first frame and a second frame based on the multiple touch locations.

In another particular embodiment, an apparatus includes a processor, a memory coupled to the processor, and a touch screen coupled to the processor. The memory includes instructions executable by the processor to detect simultaneous multiple touch locations on the touch screen for at least an activation time. The memory also includes instructions executable by the processor to split a display area of the touch screen into a first frame and a second frame in response to detection of the simultaneous multiple touch locations for at least the activation time.

One particular advantage provided by at least one of the disclosed embodiments is that a method of separating a touch screen into frames is disclosed that does not require detection of contact motion of the user on the touch screen. Another particular advantage is that at least one of the disclosed embodiments allows a simple and intuitive way to implement split screen operation of an electronic device that includes a touch screen.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
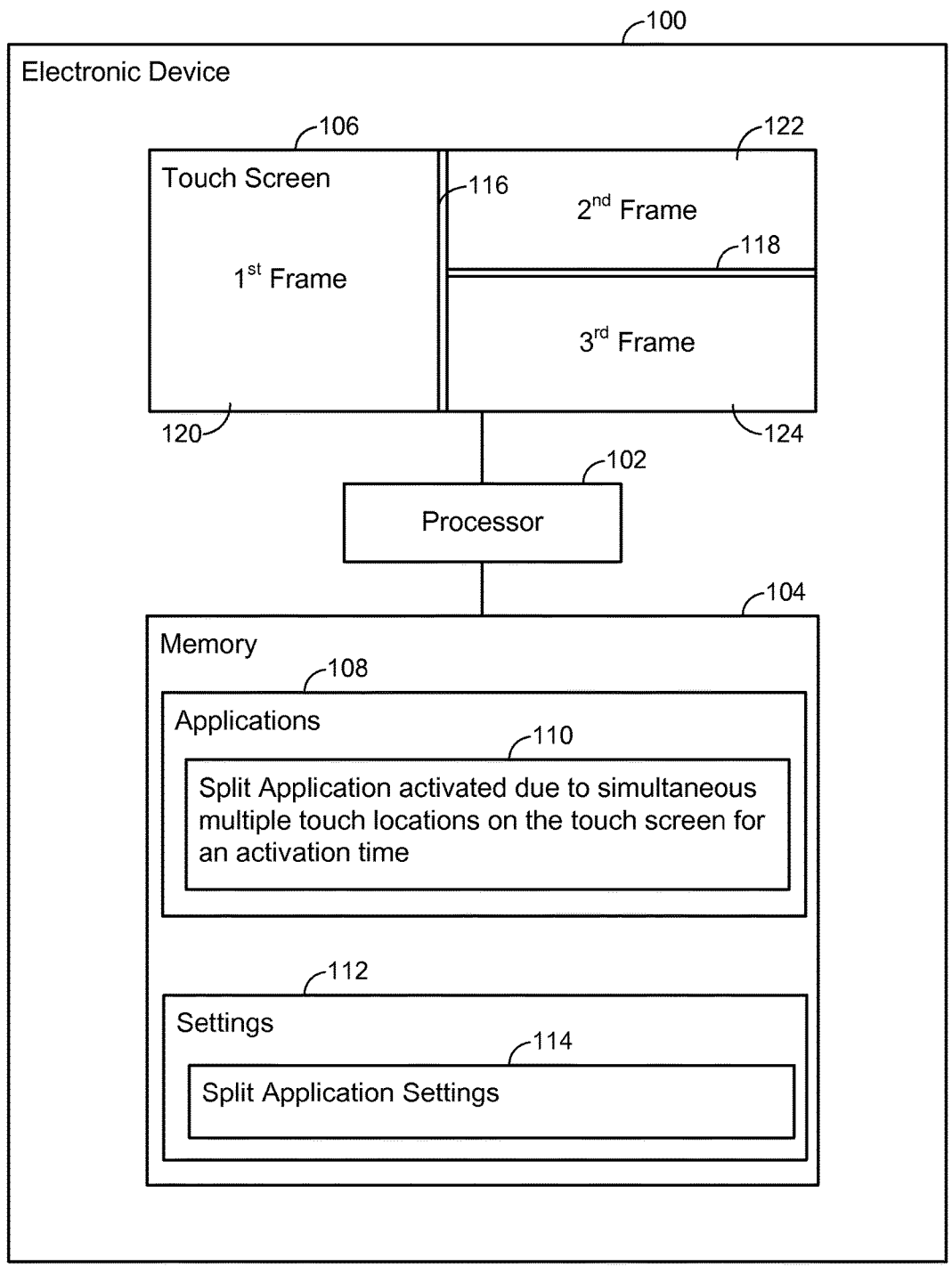
FIG. 1 is a block diagram of a particular illustrative embodiment of an electronic device operable to present multiple frames on a touch screen.

Referring to FIG. 1, a particular illustrative embodiment of an electronic device that is operable to present multiple frames on a touch screen is depicted and generally designated 100. The electronic device 100 may be, but is not limited to, a mobile phone, a music player, a video player, a gaming unit, a navigation device, a personal digital assistant, a tablet computer, a book reader, a camera, a computer, or combinations thereof. The electronic device 100 may include a processor 102, a memory 104, and a touch screen 106. The processor 102 may execute instructions of applications 108 stored in the memory 104. The applications 108 may include a split application 110. The split application 110 may be activated in response to detection of simultaneous multiple touch locations on the touch screen 106 for an activation time. The memory 104 may also store settings 112 for the applications 108 and the electronic device 100. The settings 112 may include split application settings 114 for the split application 110.

The split application 110 may include instructions executable by the processor 102 to place one or more splits 116 in the touch screen 106 to separate the image displayed on the touch screen into two or more frames. For example, the two splits 116, 118 depicted in FIG. 1 may separate the touch screen 106 into a first frame 120, a second frame 122, and a third frame 124. A user may move a particular split to another location by touching the particular split and dragging the particular split to a new location. If the user wants to remove a particular split, the user may double tap on the particular split or drag the particular split off of the touch screen 106. More than two frames may be created by creating a first split on the touch screen (e.g., the vertical split 116 that defines the first frame 120) and subsequently creating additional splits on the touch screen (e.g., the horizontal split 118 that separates the second frame 122 from the third frame 124). Four frames may be created on the touch screen by first creating a horizontal split and then creating a vertical split that crosses the horizontal split. Similarly, four frames may also be created on the touch screen by first creating a vertical split and then creating a horizontal split that crosses the vertical split.

The split application 110 may form the split 116 if a user contacts the touch screen 106 at multiple touch locations for at least an activation time, such as by laying or pressing a finger across the touch screen 106 at the location on the screen where the split 116 is desired. Each frame may display a page (e.g., a home page or a subpage) for the electronic device 100 or an application that is running in the frame. The length of the activation time and the content that is initially displayed in a frame may be controlled by settings stored in the split application settings 114. In some embodiments, the activation time is over a quarter of a second, over a half a second, over 1 second, over 1.5 seconds, or over 2 seconds. Waiting for passage of the activation time before forming a split 116 inhibits the formation of unwanted frames if the user briefly makes contact with the touch screen 106 at multiple touch locations. The activation time can be pre-set to a predetermined fixed or default value. The activation time may be changed by the user of the electronic device 100 by accessing a settings page for the split application 110 and changing parameters for the split application 110. Changed parameters may be saved in the split application settings 114. The parameters for the split application 114 may include, but are not limited to, the parameter for the activation time, a parameter to default to a horizontal split or a vertical split if the multiple contacts are on a diagonal of the touch screen 106, a parameter that allows the splits 116, 118 only to be perpendicular to sides of the touch screen 106 at one setting and allows diagonal splits, arcuate splits, or both at other settings, a parameter whose selection causes the split application 110 to present an option for a horizontal split or a vertical split if the multiple touch locations are detected for the activation time, and a parameter that specifies what is displayed in the frames if the split 116 or 118 is positioned in the touch screen 106.

In another embodiment, the split application 110 may be place a diagonal or other angled split along a line determined by the positioning of at least one finger, at least one thumb, another part of one or both hands, a stylus, or combinations thereof. A diagonal split may be advantageous, beneficial, and/or convenient for use with some types of applications (e.g., gaming applications).

The split application 110 may determine locations of the simultaneous multiple touch locations. The split application 110 may analyze the locations to determine whether the locations indicate a desire to create frames in the touch screen 106, indicate a single large contact area on the touch screen 106 (e.g., the user placed a thumb pad or a palm on the touch screen 106) without implying a desire to create frames, or indicate multiple separate contact areas without implying a desire to create frames (e.g., the user places three or more fingers across the touch screen 106). The analysis may include determining a ratio of a length of a region bounding the multiple touch locations and a width of the region, where the length of the region is greater than or equal to the width of the region. A high ratio (e.g., a ratio over a threshold value, such as 1.2, 1.5, 1.7, 2.0, or another value) may indicate that the user desires to create frames in the touch screen 106. A low ratio (e.g., a ratio equal to or below the threshold) may indicate that the user does not desire to create frames in the touch screen.

In an embodiment, the touch screen 106 may be a three dimensional (3D) display (e.g., an autostereoscopic 3D display) with 3D touch sensing (e.g., interpreting user touch and user movement via at least one optical camera that detects touch events in three dimensions, or by interpreting user touch and user movement via acoustic 3D positioning). In an embodiment, the splits 116, 118 are 3D splits with the plane of the splits 116, 118 perpendicular to the two dimensional (2D) surface of the touch screen 106. For example, the user may place the edge of a hand on the surface of the touch screen 106 with the plane of the hand in the desired location of a split (e.g., the split 116) for the activation time. The split application 110 creates the split 116 in 3D space displayed on the touch screen 106. In another embodiment, the splits 116, 118 occur along a plane or surface defined by 3D movement of the user with respect to touch screen 106 (e.g., by a finger of the user hovering above the touch screen 106 for the activation time and moving in a plane or surface that ends in a position on the 2D surface. In such a case, the split application 110 creates the split 116 or 118 to correspond with the plane or surface traced by the user. In another embodiment, the 3D split occurs along a surface defined by 3D movement of a finger of the user starting in a position on the 2D surface when the finger is placed on the surface for the activation time and extending above the surface. In the last two embodiments, time may be used to determine the occurrence of the split 116 or 118. For example, in the embodiment defining the 3D split along a surface starting with positioning the finger on the 2D touch surface, upon detection that the finger left the 2D surface, moving the finger along a 3D surface between a minimum time (e.g., 0.25 seconds) and a maximum time (e.g., 2 seconds), or just one of them, defines the surface of the split 116 or 118.

In another embodiment, to indicate operational control of a 2D or a 3D screen split, an additional indication (e.g., a double tap) is provided upon completion of the split surface defining movement to indicate that the movement was to define a split. Such a process could include positioning the finger on the 2D surface, moving the finger along an acceptable route defining the desired split, and providing the additional indication (e.g., the double tap) on the 2D surface with another finger to indicate that the split is to be created.

The split 116, 118 may be horizontal along a line determined by the multiple touch locations if the multiple touch locations are substantially horizontal. The multiple touch locations may be substantially horizontal when a line that fits the multiple touch locations is within about 30 degrees of horizontal, within about 20 degrees of horizontal, or within about 10 of horizontal. The split 116, 118 may be vertical along a line determined by the multiple touch locations if the multiple touch locations are substantially vertical. The multiple touch locations may be substantially vertical when a line that fits the multiple touch locations is within about 30 degrees of vertical, within about 20 degrees of vertical, or within about 10 of vertical. The split 116, 118 may be at an angle along a line determined by the multiple touch locations if the multiple touch locations are not substantially vertical or substantially horizontal.

Figure 2:
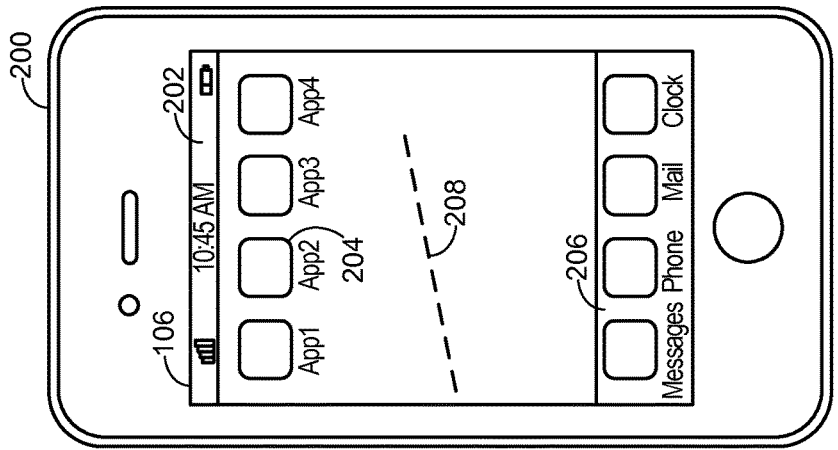
FIG. 2 is a representation of an embodiment of an electronic device capable of presenting multiple frames on a touch screen of the electronic device.

FIG. 2 depicts a particular illustrative embodiment of an electronic device 200 with a touch screen 106 before a split is positioned on the touch screen 106. The touch screen 106 may display a home page for the electronic device 100 that includes a status bar 202, application icons 204, and a frequently used applications bar 206. A user may simultaneously contact the touch screen 106 at multiple locations indicated by a line 208 for the activation time to place a split on the touch screen 106 that separates the touch screen 106 into a first frame and a second frame. In an embodiment, the user may simultaneously contact the touch screen 106 at the multiple locations by placing a portion of a thumb or finger across the touch screen 106 along the line 208 (e.g., by lightly placing the palm side of the finger across the touch screen 106 so that the phalanges of the finger form one or more line segments along the line 208). In another embodiment, the user may simultaneously contact the touch screen 106 at the multiple locations by placing the tips of two or more digits (e.g., fingers, thumbs, or combinations thereof) next to each other to form the line 208 across the touch screen 106 so that tips of the digits form line segments along the line 208. In another embodiment, the user may simultaneously contact the touch screen 106 at the multiple locations by placing the edge of the hand across the touch screen 106 to form the line 208 across the touch screen 106. The line 208 may be formed by other manipulations of body parts (e.g., fingers, hands, arms, etc.) across the touch screen 106 in a manner that forms one or more line segments along the line 208. The frames may be formed without requiring the electronic device 100 to track movement of a touch location across the touch screen 106. The line 208 may pass through, or not pass through (as depicted in FIG. 2), one or more of the status bar 202, the application icons 204, and the frequently used applications bar 206.

Figure 3:
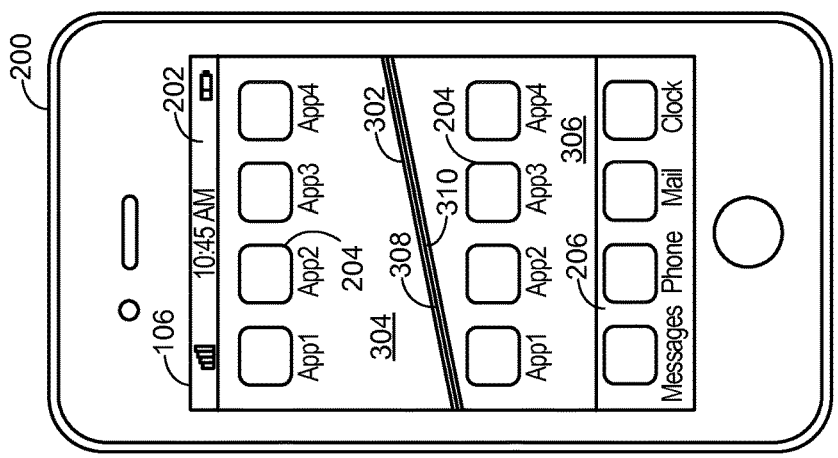
FIG. 3 is a representation of the embodiment of the electronic device of FIG. 2 with multiple frames presented on the touch screen.

FIG. 3 depicts the electronic device 200 of FIG. 2 if the user contacts the touch screen 106 along the multiple touch locations indicated by the line 208 of FIG. 2 for the activation time and if the settings for the split application allow slanted splits, arcuate splits, or both. As shown in FIG. 3, a split 302 is positioned from a first side of the touch screen 106 to a second side of the touch screen 106 substantially along the path of multiple touch locations (as represented by the line 208 in FIG. 2). The split 302 divides the touch screen 106 into a first frame 304 and a second frame 306. In some embodiments, the split 302 may have a width that allows an upper portion 308 of the split 302 to be a different color than a bottom portion 310 of the split 302. A color indicator (e.g., a red or other distinct color) may be present in the upper portion 308 or the bottom portion 310 of the split 302 to indicate which frame 304 or 306 will host an application selected from the frequently used applications bar 206, or which frame is "active" in some applications, such as split-screen scrolling through an e-book. The other portion 310 or 308 of the split 302 may be a different color (e.g., gray) that is visibly distinct from the color of the color indicator. The user may change where the color indicator is shown by touching the touch screen 106 in the frame 304 or 306 not indicated by the color indicator without contacting one of the application icons 204.

Figure 4:
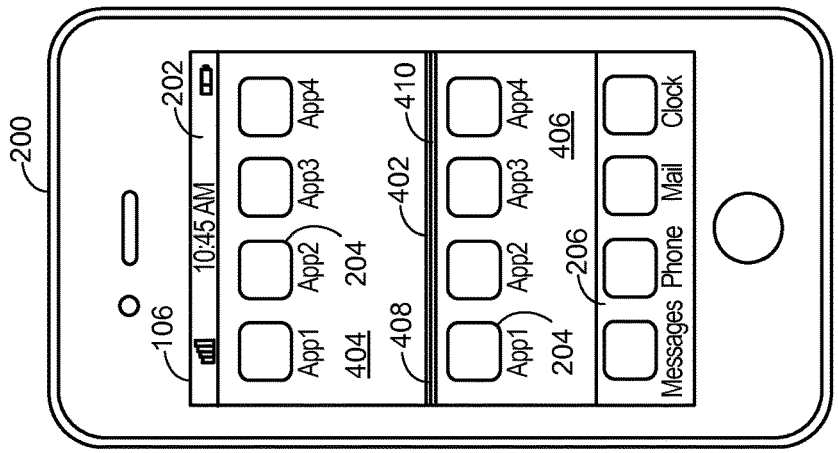
FIG. 4 is a second representation of the embodiment of the electronic device of FIG. 2 with multiple frames presented on the touch screen.

FIG. 4 depicts the electronic device 200 of FIG. 2 if the user contacts the touch screen 106 along the multiple touch locations indicated by the line 208 of FIG. 2 for the activation time and if the settings for the split application only allows splits that are parallel or perpendicular to sides of the touch screen 106 relative to a particular side or particular sides. As shown in FIG. 4, a split 402 is positioned from a first side of the touch screen 106 to a second side of the touch screen 106 perpendicular to long sides of the touch screen 106. The split 402 divides the touch screen 106 into a first frame 404 and a second frame 406. The split 402 may be located about halfway between an uppermost touch location and a lowermost touch location of the line 208 depicted in FIG. 2. In other embodiments, the split 402 may be located at the uppermost touch location of the line 208, the lowermost touch location of the line 208, or some other location. A color indicator may be present in an upper portion 408 or a bottom portion 410 of the split 402 to indicate which frame 404 or 406 is currently active and will host an application selected from the frequently used applications bar 206.

Figure 5:
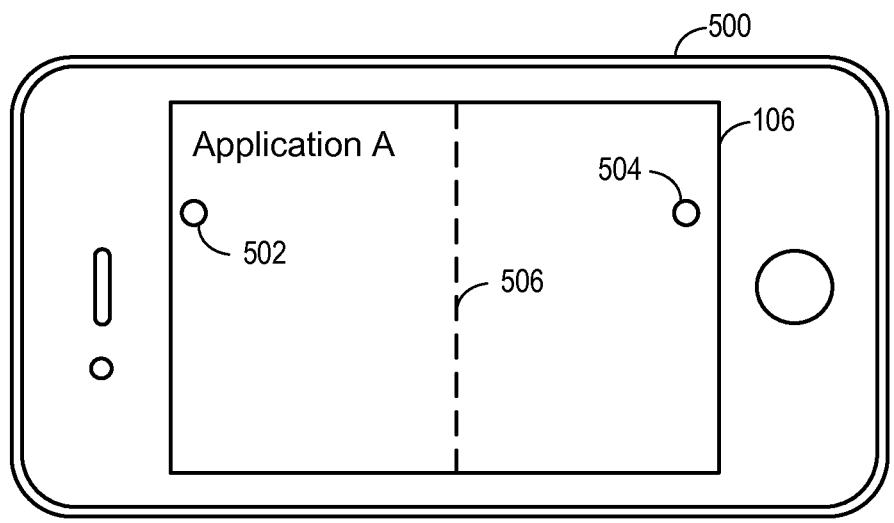
FIG. 5 is a representation of an embodiment of an electronic device capable of presenting multiple frames on a touch screen of the electronic device.

FIG. 5 depicts a particular illustrative embodiment of an electronic device 500 displaying an Application A on the touch screen 106 that is running on the electronic device 500. The user of the electronic device 500 may contact the touch screen 106 at multiple touch locations for the activation time to split the touch screen 106 into a first frame and a second frame. For example, the user may simultaneously touch a first location 502 and a second location 504 for the activation time to produce a horizontal split on the touch screen 106. In an embodiment, the user may contact the first location 502 with a first fingertip and may contact the second location 504 with a second fingertip. Alternatively, instead of contacting the first location 502 and the second location 504, the user may simultaneously touch the touch screen at multiple locations along a line 506 for the activation time to produce a vertical split on the touch screen 106.

Figure 6:
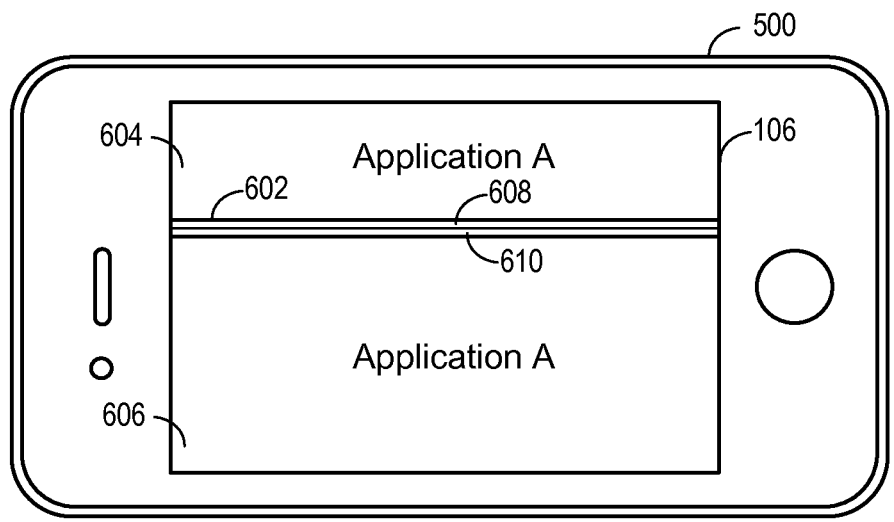
FIG. 6 is a representation of the embodiment of the electronic device of FIG. 5 with multiple frames presented on the touch screen.

FIG. 6 depicts the electronic device 500 of FIG. 5 if the user simultaneously contacts the touch screen 106 at the first location 502 and the second location 504 of FIG. 5 for the activation time and if the settings for the split application place an instance of a running application in each frame. As shown in FIG. 6, a split 602 is positioned horizontally from a first side of the touch screen 106 to a second side of the touch screen 106. The split 602 may correspond to a line between the first location 502 and the second location 504 of FIG. 5, and may separate the touch screen into a first frame 604 and a second frame 606. An instance of the Application A may be shown in each frame 604, 606. In a particular illustrative embodiment, the Application A is a book reader. Multiple instances of the Application A may allow the user to display different sections of the same content on the touch screen 106 at the same time. A color indicator (e.g., a red or other distinct color) may be present in a first portion 608 or a second portion 610 of the split 602 to indicate which frame 604 or 606 is currently active. The other portion 610 or 608 of the split 602 may be a different color (e.g., gray) that is visibly distinct from the color of the color indicator. The user may change where the color indicator is shown by touching the touch screen 106 in the frame 604 or 606 not indicated by the color indicator.

Figure 7:
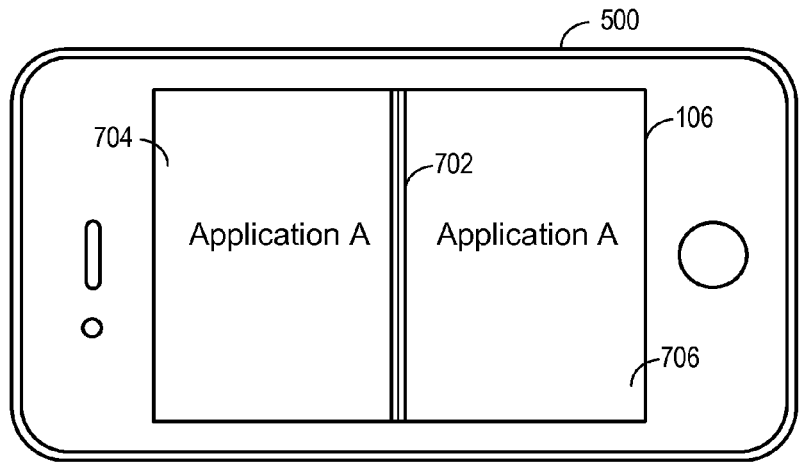
FIG. 7 is a second representation of the embodiment of the electronic device of FIG. 5 with multiple frames presented on the touch screen.

FIG. 7 depicts the electronic device 500 of FIG. 5 if the user simultaneously contacts the touch screen 106 along the multiple touch locations indicated by the line 506 of FIG. 5 for the activation time and if the settings for the split application place instances of a running application in each frame. As shown in FIG. 7, a split 702 is positioned vertically from a first side (e.g., a top side) of the touch screen 106 to a second side (e.g., a bottom side) of the touch screen 106. The split 702 separates the touch screen into a first frame 704 and a second frame 706. An instance of the Application A may be shown in each frame 704, 706, with a first instance of the Application A activated in the first frame 704 and a second instance of the Application A activated in the second frame 706.

Figure 8:
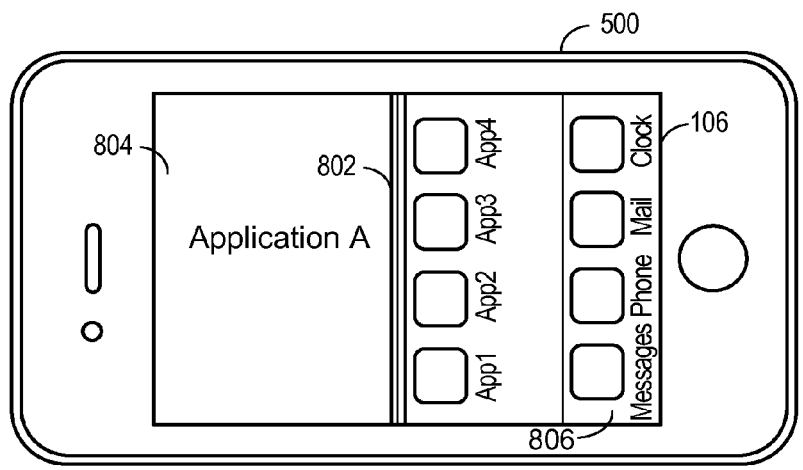
FIG. 8 is a third representation of the embodiment of the electronic device of FIG. 5 with multiple frames presented on the touch screen.

FIG. 8 depicts the electronic device 500 of FIG. 5 if the user simultaneously contacts the touch screen 106 at the multiple touch locations indicated by the line 506 of FIG. 5 for the activation time and if the settings for the split application place an instance of a running application in a first frame and a home page in a second frame. As shown in FIG. 8, a split 802 is positioned vertically from a first side of the touch screen 106 to a second side of the touch screen 106. An instance of the Application A is maintained in a first frame 804, and a home page is displayed in a second frame 806. The user may run a particular application in the second frame 806 by touching an application icon for the particular application.

Figure 9:
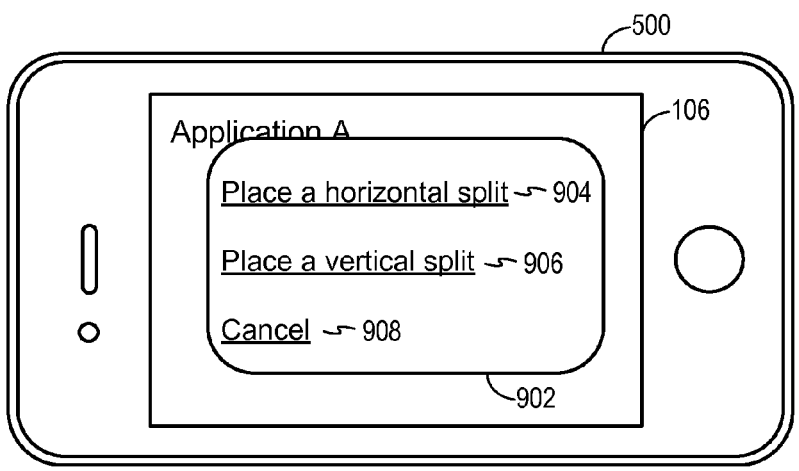
FIG. 9 is a fourth representation of the embodiment of the electronic device of FIG. 5 in which the electronic device presents options in response to detection of multiple touch locations for at least the activation time.

FIG. 9 depicts the electronic device 500 of FIG. 5 if the user simultaneously contact the touch screen either at the first location 502 and the second location 504 of FIG. 5 for the activation time or along the multiple touch locations indicated by the line 506 of FIG. 5 for the activation time and if the settings for the split application are set to present an option for a horizontal split (e.g., parallel to the long sides of the touch screen 106) or a vertical split (e.g., parallel to the short sides of the touch screen 106). The split application may present a window 902 that includes a first option 904 to place a horizontal split, a second option 906 to place a vertical split, and a third option 908 to cancel. If the user selects the first option 904, a presentation similar to the presentation depicted in FIG. 6 may be presented to the user if the user has chosen to have an application that is running presented in the created frames. If the user selects the second option 906, a presentation similar to the presentation depicted in FIG. 7 may be presented to the user if the user has chosen to have an application that is running presented in the created frames. If the user selects the third option 908, or if the user does not make a selection of one of the options 904-908 within a timeout period, the presentation may revert to a presentation similar to the presentation depicted in FIG. 5.

Figure 10:
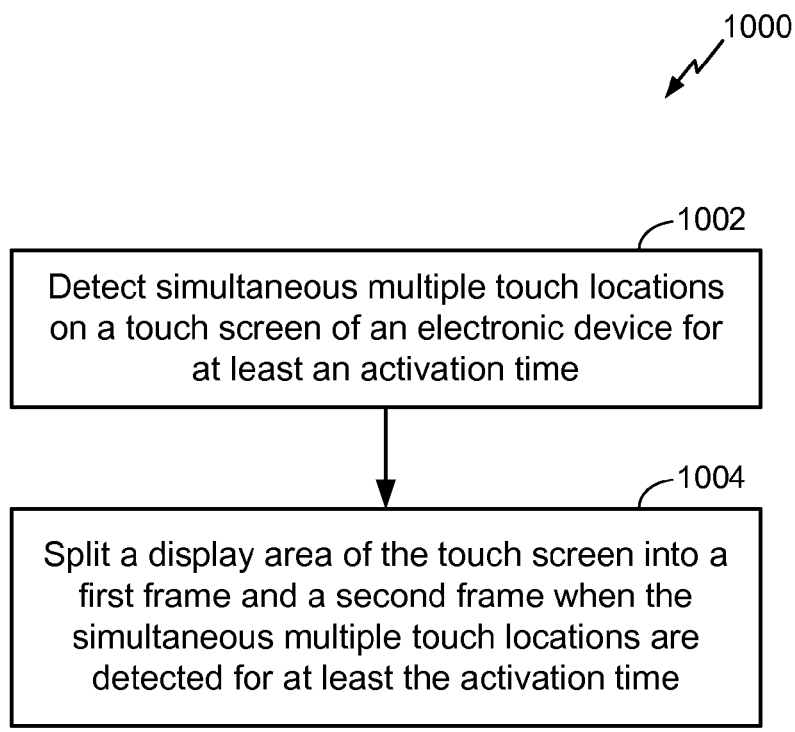
FIG. 10 is a flow diagram of a first illustrative embodiment of a method of presenting multiple frames on a touch screen.

Referring to FIG. 10, a flow diagram of a first illustrative embodiment of a method of presenting multiple frames on a touch screen is depicted and generally designated 1000. As an illustrative example, the method 1000 may be performed by the electronic device of FIG. 1 and result in the touch screens 106 presented in FIG. 3, FIG. 4, and FIGS. 6-8.

The method 1000 includes detecting simultaneous multiple touch locations on a touch screen of an electronic device for at least an activation time, at 1002. The method 1000 also includes splitting a display area of the touch screen into a first frame and a second frame if the simultaneous multiple touch locations are detected for at least the activation time, at 1004.

The detected simultaneous multiple touch locations may be produced by a portion of a user (e.g., part of a finger or thumb), an instrument (e.g., a stylus), or combinations thereof. For example, the electronic device may detect the simultaneous multiple touch locations if a user places a portion of a hand in contact with at least a portion of the touch screen. The portion of the hand may be, but is not limited to, an edge of the hand, a portion of at least one finger, a portion of a thumb, a portion of two fingers (e.g., two finger tips), a portion of a finger and a portion of a thumb, or combinations thereof. The simultaneous multiple touch locations may be made with portions of different hands, with different body parts (e.g., a portion of an arm, a portion of a foot, or portions of two feet), or combinations thereof.

A split between the first frame and the second frame may extend along a path between endmost contact points on the touch screen of the simultaneous multiple touch locations. The split may extend to edges of the touch screen. In some embodiments, the split may be a slanted line that extends from a first edge of the touch screen to a second edge of the touch screen along a line determined by the multiple touch locations, such as illustrated in FIG. 3. The user may move the location of the split by touching the split and dragging the split to a new location.

In other embodiments, the split may be perpendicular to an edge of the touch screen, such as illustrated in FIG. 4. If at least one of the multiple touch locations contacts an edge of the touch screen, the split may run perpendicular to the edge across the touch screen. The split may start at the contact on the edge, at a location midway between the contact at the edge and a contact point farthest away from the contact at the edge, or at another location relative to the contact on the edge.

If at least one of the multiple touch locations does not contact an edge of the touch screen, the split may be positioned based on endmost touch locations. For example, if a first touch location is near a first long side of the touch screen and a second touch location is near a second long side of the touch screen, the split may be positioned from the first long side to the second long side midway between the first touch location and the second touch location. As another example, if a first touch location is near the first long side of the touch screen and the second touch location is also near the first long side of the touch screen, the split may be positioned from the first long side to the second long side midway between the first touch location and the second touch location. As another example, if the uppermost touch location and the lowermost touch location are located on a diagonal of a rectangular touch screen, the split may default to a split that is perpendicular to a long side of the touch screen. A setting for the touch screen may be changed so that a split is perpendicular to a short side of the touch screen if the uppermost touch location and the lowermost contact location are located on the diagonal of the rectangular touch screen. The user may move the location of the split by touching the split and dragging the split to a new location.

Although the method 1000 describes splitting a display area into a first frame and a second frame, in other embodiments, the method 1000 can be applied to split existing frames. For example, a simultaneous multiple touch location can be detected to split a second frame into a modified second frame and a third frame, such as the second frame 122 and the third frame 124 of FIG. 1.

Figure 11:
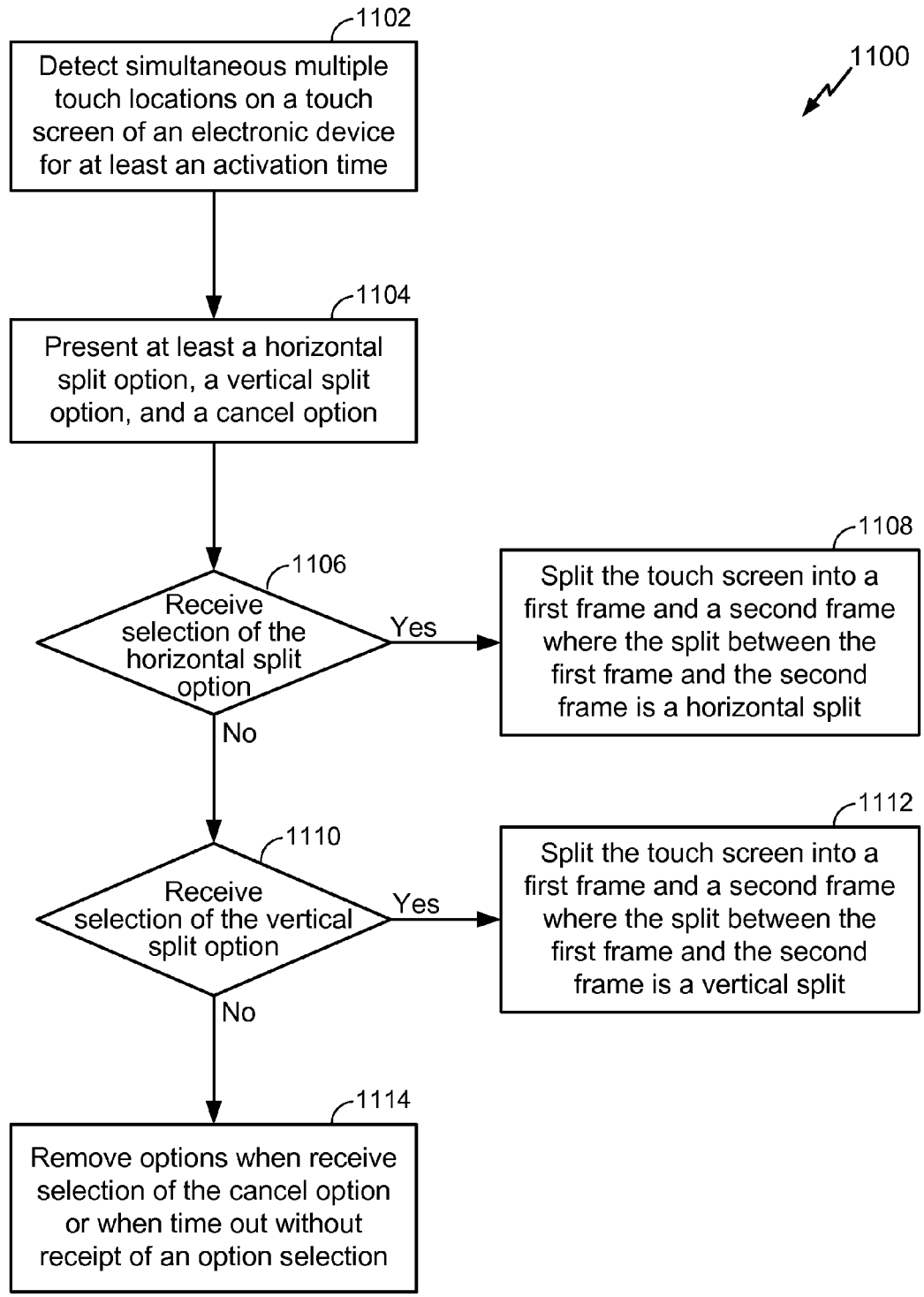
FIG. 11 is a flow diagram of a second illustrative embodiment of a method of presenting multiple frames on a touch screen.

Referring to FIG. 11, a flow diagram of a first illustrative embodiment of a method of presenting multiple frames on a touch screen is depicted and generally designated 1100. As an illustrative example, the method 1100 may be performed by the system of FIG. 1 and result in the touch screens 106 presented in FIG. 3, FIG. 4, and FIGS. 6-9.

The method 1100 includes detecting simultaneous multiple touch locations on a touch screen of an electronic device for at least an activation time, at 1102. The method 1100 also includes presenting at least a horizontal split option, a vertical split option, and a cancel option, at 1104.

At 1106, a determination is made whether selection of the horizontal split option is received from a user. If the user selects the horizontal split option, the touch screen is split into a first frame and a second frame, where the split between the first frame and the second frame is a horizontal split, at 1108. The position of the split may be midway between an upper edge and a lower edge of the touch screen, or the position of the split may be based on the multiple touch locations. The user may move the location of the split by touching the split and dragging the split to a new location.

If selection of the horizontal split option is not detected, a determination is made whether selection of the vertical split option is received from the user, at 1110. If the user selects the vertical split option, the touch screen is split into a first frame and a second frame, where the split between the first frame and the second frame is a vertical split, at 1112. The position of the split may be midway between a left edge and right edge of the touch screen, or the position of the split may be based on the multiple touch locations. The user may move the location of the split by touching the split and dragging the split to a new location.

If neither the horizontal split option nor the vertical split option are received, the method 1100 may remove presentation of the horizontal split option, the vertical split option, and the cancel option, at 1114. The options may be removed if the cancel option is received, or if a timeout occurs without receiving selection of an option.

Figure 12:
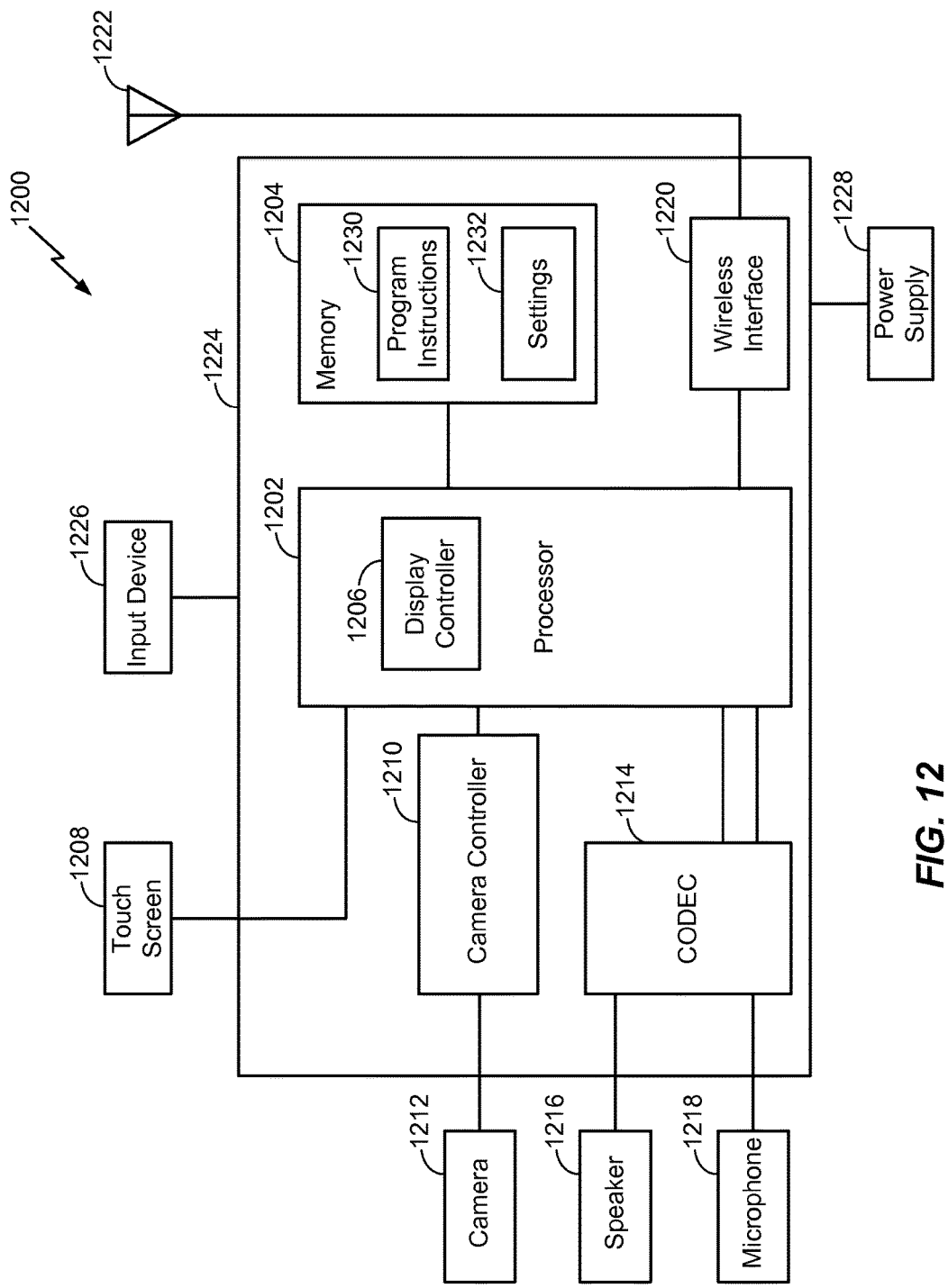
FIG. 12 is a block diagram of a particular illustrative embodiment of a wireless device capable of presenting multiple frames on a touch screen of the wireless device.

Referring to FIG. 12, a block diagram of a particular illustrative embodiment of an electronic device, such as a mobile phone, is depicted and generally designated 1200. Alternatively, the electronic device 1200 may be a music player, a video player, a gaming unit, a navigation device, a communications device, a personal digital assistant (PDA), a tablet computer, a book reader, a camera, a computer, or combinations thereof. The device 1200 includes a processor 1202 coupled to a memory 1204. The processor 1202 includes or is coupled to a display controller 1206. The display controller 1206 may receive display input from a touch screen 1208. The display controller 1206 may also provide display output to the touch screen 1208.

FIG. 12 also shows a camera controller 1210 that is coupled to the processor 1202. A camera 1212 can be coupled to the camera controller 1210. A coder/decoder (CODEC) 1214 can also be coupled to the processor 1202. A speaker 1216 and a microphone 1218 can be coupled to the CODEC 1214.

FIG. 12 also indicates that a wireless interface 1220 can be coupled to the processor 1202 and to a wireless antenna 1222. In a particular embodiment, the processor 1202, the display controller 1206, the memory 1204, the CODEC 1214, the camera controller 1210, and the wireless interface 1220, are included in a system-in-package or system-on-chip 1224. In a particular embodiment, an input device 1226 and a power supply 1228 are coupled to the on-chip system 1224. Moreover, in a particular embodiment, as illustrated in FIG. 12, the touch screen 1208, the input device 1226, the speaker 1216, the microphone 1218, the wireless antenna 1222, and the power supply 1228 are external to the on-chip system 1224. However, each can be coupled to a component of the on-chip system 1224, such as an interface or a controller.

In a particular embodiment, the processor 1202 executes processor-readable program instructions from a processor-readable medium, such as program instructions 1230 stored at the memory 1204. The processor 1202 may utilize parameters and information stored in the settings 1232 during execution of the program instructions. For example, the memory 1204 may be readable by the processor 1202 and the program instructions 1230 may be operational instructions that are executable by the processor 1202 to perform the method 1000 of FIG. 10, the method 1100 of FIG. 11, or both.

For example, the program instructions 1230 may include instructions that are executable by the processor 1202 to detect simultaneous multiple touch locations on the touch screen 1208 of the electronic device 1200 for at least an activation time. The program instructions 1230 may further include instructions that are executable by the processor 1202 to split a display area of the touch screen into a first frame and a second frame if the simultaneous multiple touch locations are detected for at least the activation time.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present disclosure.

The methods of FIGS. 10 and 11 may be performed by executing program code that may be stored in memory in the form of computer readable instructions. In that case, a processor, such as a digital signal processor (DSP), an image signal processor (ISP), or other processor, may execute instructions stored in memory in order to carry out one or more of the image processing methods. In some cases, the methods may be executed by a DSP or ISP that invokes various hardware components to accelerate the image processing. In other cases, the units described herein may be implemented as, or methods may be performed by, a microprocessor, one or more application specific integrated circuits (ASICs), one or more field programmable gate arrays (FPGAs), or any combination thereof.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory computer readable storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
   detecting a first touch event that corresponds to a first phalange of a single finger of a single user remaining at a first location on a touch screen of an electronic device for at least a defined length of time;
   detecting a second touch event that is simultaneous with the first touch event and corresponds to a second phalange of the single finger of the single user remaining at a second location on the touch screen of the electronic device for at least the defined length of time;
   determining to split a display area of the touch screen into a first frame and a second frame in response to detecting the first touch event that corresponds to the first phalange of the single finger of the single user remaining at the first location on the touch screen of the electronic device for at least the defined length of time and detecting the second touch event that is simultaneous with the first touch event and corresponds to the second phalange of the single finger of the single user remaining at the second location on the touch screen of the electronic device for at least the defined length of time;
   determining a splitting line using the first location and the second location; and
   splitting the display area of the touch screen into the first frame and the second frame such that the first frame is on one side of the splitting line and the second frame is on an opposite side of the splitting line.

2. The method of claim 1, wherein the first location on the touch screen at which the first phalange of the single finger of the single user remains for at least the defined length of time is at a first edge of the touch screen, and
   wherein the second location on the touch screen at which the second phalange of the single finger of the single user remains for at least the defined length of time is at a second edge of the touch screen, wherein the single finger extending across a width of the touch screen from the first edge to the second edge is detected.

3. The method of claim 1, wherein the detected first touch event corresponds to the first phalange of the single finger of the single user remaining palm down at the first location on the touch screen for at least the defined length of time; and
   wherein the detected second touch event corresponds to the second phalange of the single finger of the single user remaining palm down at the second location on the touch screen for at least the defined length of time.

4. The method of claim 1, further comprising:
   extending the splitting line from a first edge of the touch screen to an opposing edge of the touch screen, wherein the first location and the second location correspond to individual segments of the splitting line.

5. The method of claim 1, further comprising:
   determining the splitting line as corresponding to a line from the first location to the second location when the line from the first location to the second location is horizontal to an edge of the touch screen; and
   computing the splitting line to be horizontal to an edge of the touch screen and located between the first location and the second location when the line from the first location to the second location is slanted with respect to the edge of the touch screen.

6. An apparatus comprising:
   a processor;
   a memory coupled to the processor; and
   a touch screen coupled to the processor;
   wherein the memory includes instructions executable by the processor to:
   detect a first touch event that corresponds to a first phalange of a single finger of a single user remaining at a first location on the touch screen for at least a defined length of time;
   detect a second touch event that is simultaneous with the first touch event and corresponds to a second phalange of the single finger of the single user remaining at a second location on the touch screen for at least the defined length of time;
   determine to split a display area of the touch screen into a first frame and a second frame in response to detecting the first touch event that corresponds to the first phalange of the single finger of the single user remaining at the first location on the touch screen of the electronic device for at least the defined length of time and detecting the second touch event that is simultaneous with the first touch event and corresponds to the second phalange of the single finger of the single user remaining at the second location on the touch screen of the electronic device for at least the defined length of time;
   determine a splitting line using the first location and the second location: and
   split the display area of the touch screen into the first frame and the second frame such that the first frame is on one side of the splitting line and the second frame is on an opposite side of the splitting line.

7. The apparatus of claim 6, wherein the electronic device comprises a mobile phone, a music player, a video player, a gaming unit, a navigation device, a communications device, a personal digital assistant, a tablet computer, a book reader, a camera, or a combination thereof.

8. The apparatus of claim 6, wherein the detected first touch event corresponds to the first phalange of the single finger of the single user remaining palm down at the first location on the touch screen for at least the defined length of time; and
   wherein the detected second touch event corresponds to the second phalange of the single finger of the single user remaining palm down at the second location on the touch screen for at least the defined length of time.

9. The apparatus of claim 6, wherein the memory further includes instructions executable by the processor to:
   extend the splitting line from a first edge of the touch screen to an opposing edge of the touch screen, wherein the first location and the second location correspond to individual segments of the splitting line.

10. The apparatus of claim 6, wherein the memory further includes instructions executable by the processor to:
    determine the splitting line as corresponding to a line from the first location to the second location when the line from the first location to the second location is horizontal to an edge of the touch screen; and
    compute the splitting line to be horizontal to an edge of the touch screen and located between the first location and the second location when the line from the first location to the second location is slanted with respect to the edge of the touch screen.

11. A non-transitory computer readable medium storing processor-executable instructions that, when executed by a processor, cause the processor to perform operations comprising:

detecting a first touch event that corresponds to a first phalange of a single finger of a single user remaining at a first location on a touch screen of an electronic device for at least a defined length of time;

detecting a second touch event that is simultaneous with the first touch event and corresponds to a second phalange of the single finger of the single user remaining at a second location on the touch screen of the electronic device for at least the defined length of time;

determining to split a display area of the touch screen into a first frame and a second frame in response to detecting the first touch event that corresponds to the first phalange of the single finger of the single user remaining at the first location on the touch screen of the electronic device for at least the defined length of time and detecting the second touch event that is simultaneous with the first touch event and corresponds to the second phalange of the single finger of the single user remaining at the second location on the touch screen of the electronic device for at least the defined length of time;

determining a splitting line using the first location and the second location; and splitting the display area of the touch screen into the first frame and the second frame such that the first frame is on one side of the splitting line and the second frame is on an opposite side of the splitting line.

12. The non-transitory computer readable medium of claim 11, wherein the detected first touch event corresponds to the first phalange of the single finger of the single user remaining palm down at the first location on the touch screen for at least the defined length of time; and wherein the detected second touch event corresponds to the second phalange of the single finger of the single user remaining palm down at the second location on the touch screen for at least the defined length of time.

13. The non-transitory computer readable medium of claim 11, wherein the operations performed by the processor further comprise:

extending the splitting line from a first edge of the touch screen to an opposing edge of the touch screen, wherein the first location and the second location correspond to individual segments of the splitting line.

14. The non-transitory computer readable medium of claim 11, wherein the operations performed by the processor further comprise:

determining the splitting line as corresponding to a line from the first location to the second location when the line from the first location to the second location is horizontal to an edge of the touch screen; and computing the splitting line to be horizontal to an edge of the touch screen and located between the first location and the second location when the line from the first location to the second location is slanted with respect to the edge of the touch screen.

* * * * *